(12) United States Patent
Hori

(10) Patent No.: US 11,389,892 B2
(45) Date of Patent: Jul. 19, 2022

(54) JOINING METHOD AND METHOD FOR MANUFACTURING A ROLLED COMPOSITE MATERIAL

(71) Applicant: NIPPON LIGHT METAL COMPANY, LTD., Tokyo (JP)

(72) Inventor: Hisashi Hori, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 17/048,076

(22) PCT Filed: Jan. 17, 2019

(86) PCT No.: PCT/JP2019/001232
§ 371 (c)(1),
(2) Date: Oct. 15, 2020

(87) PCT Pub. No.: WO2019/239623
PCT Pub. Date: Dec. 19, 2019

(65) Prior Publication Data
US 2021/0162531 A1 Jun. 3, 2021

(30) Foreign Application Priority Data
Jun. 15, 2018 (JP) .............................. JP2018-114673

(51) Int. Cl.
*B23K 20/00* (2006.01)
*B23K 20/12* (2006.01)
(Continued)

(52) U.S. Cl.
CPC ...... *B23K 20/1225* (2013.01); *B23K 20/1255* (2013.01); *B23K 2103/10* (2018.08); *B23K 2103/12* (2018.08); *B23K 2103/18* (2018.08)

(58) Field of Classification Search
CPC .............. B23K 20/122; B23K 20/1255; B23K 20/127; B23K 20/2333; B23K 20/1225
See application file for complete search history.

(56) References Cited

U.S. PATENT DOCUMENTS 8,167,188 B2 * 5/2012 Nakagawa .......... B29C 65/5035
228/112.1
10,835,989 B2 * 11/2020 Werz .................. B23K 20/1255
(Continued)

FOREIGN PATENT DOCUMENTS

EP 2703110 A1 3/2014
JP 10-52771 A 2/1998
(Continued)

OTHER PUBLICATIONS

Office Action for Chinese Patent Application No. 201980029186.4 (dated Aug. 12, 2021).
(Continued)

*Primary Examiner* — Erin B Saad
(74) *Attorney, Agent, or Firm* — Merchant & Gould P.C.

(57) ABSTRACT

The present invention includes: a preparation process configured to provide a first metal member including an end portion with a vertical face, and a second metal member including an end portion with an inclined face, a higher melting point and a smaller plate thickness than the first metal member; a butting process configured to butt the end portions of the first metal member and the second metal member against each other and form a butted portion with a V-shaped gap; and a joining process configured to join the first metal member and the second metal member together by inserting the rotating rotary tool from only a front face of the first metal member and relatively moving the rotary tool along the butted portion while only the stirring pin is in contact with at least the first metal member.

8 Claims, 6 Drawing Sheets

(51) Int. Cl.
   *B23K 103/18* (2006.01)
   *B23K 103/10* (2006.01)
   *B23K 103/12* (2006.01)

(56) References Cited

U.S. PATENT DOCUMENTS

| | | | |
|---|---|---|---|
| 11,141,812 B2* | 10/2021 | Ikeda | B23K 20/1265 |
| 2010/0159265 A1* | 6/2010 | Fairchild | C22C 38/02 |
| | | | 428/586 |
| 2016/0375518 A1* | 12/2016 | Revel-Muroz | B23K 9/0216 |
| | | | 219/137 R |
| 2018/0043465 A1* | 2/2018 | Hori | B23K 20/127 |

FOREIGN PATENT DOCUMENTS

| | | |
|---|---|---|
| JP | 2016-150380 A | 8/2016 |
| TW | 200724274 A | 7/2007 |
| WO | 2012/147204 A1 | 11/2012 |
| WO | 2016/132768 A1 | 8/2016 |
| WO | 2018/193639 A1 | 10/2018 |

OTHER PUBLICATIONS

International Search Report for No. PCT/JP2019/001232 dated Apr. 16, 2019.

* cited by examiner

JOINING METHOD AND METHOD FOR MANUFACTURING A ROLLED COMPOSITE MATERIAL

This application is a National Stage Application of PCT/JP2019/001232, filed Jan. 17, 2019, which claims benefit of priority to Japanese Patent Application No. 2018-114673, filed Jun. 15, 2018, which applications are incorporated herein by reference. To the extent appropriate, a claim of priority is made to each of the above disclosed applications.

TECHNICAL FIELD

The present invention relates to a joining method and a method for manufacturing a rolled composite material.

BACKGROUND ART

Patent Literature 1 discloses a technique to bring metal members made of different materials into friction stir welding by using a rotary tool, for example.

CITATION LIST

Patent Literature

Patent Literature 1: Japanese Patent Application Publication No. 2016-150380

SUMMARY OF THE INVENTION

Technical Problem

Such a conventional joining method is designed to provide both end portions of a first metallic member and a second metallic member with inclined faces, and to bring these inclined faces into surface contact to butt each other. In this regard, there has been a problem that forming inclined faces is complicated and a preparation process and a butting process are complicated because the surface contact is not occurred unless the inclination angles of the metallic members are equal to each other.

In view of the above, it is an object of the present invention to provide a joining method and a method for manufacturing a rolled composite material, which are capable of easily joining metallic members of different types.

Solution to Problem

In order to solve the problems described above, the present invention provides a joining method for joining a pair of metallic members made of different materials by using a rotary tool with a tapered stirring pin, the method includes: a preparation process configured to provide a first metal member including an end portion with a vertical face, and a second metal member including an end portion with an inclined face, the second metal member having a higher melting point and a smaller plate thickness the first metal member; a butting process configured to butt the end portions of the first metal member and the second metal member against each other and form a butted portion with a V-shaped gap; and a joining process configured to join the first metal member and the second metal member together by inserting the rotating rotary tool from only a front face of the first metal member and relatively moving the rotary tool along the butted portion while only the stirring pin is in contact with at least the first metal member.

Further, the present invention provides a method for manufacturing a rolled composite material formed from a pair of metal members made of different materials, the method includes: a preparation process configured to provide a first metal member including an end portion with a vertical face, a second metal member including an end portion with an inclined face, the second metal member having a higher melting point and a smaller plate thickness than the first metal member, and a rotary tool with a tapered stirring pin; a butting process configured to butt the end portions of the first metal member and the second metal member against each other and form a butted portion with a V-shaped gap; a joining process configured to join the first metal member and the second metal member together by inserting the rotating rotary tool from only a front face of the first metal member and relatively moving the rotary tool along the butted portion while only the stirring pin is in contact with at least the first metal member; and a rolling process configured to roll the metal members joined in the joining process in a rolling direction along a joining line of the metal members.

According to the method described above, only the second metal member needs to have the inclined face. Moreover, since the both metal members are butted together while the V-shaped gap are formed in between them, butting may be carried out easily without requiring high precision. Moreover, by inserting the rotary tool in such a way as to come into contact only with the first metal member, for example, a joining condition may adjusted with considering to the first metal member having a lower softening temperature, and thus an amount of heat input is reduced. As a consequence, generation of excessive burrs caused by significant softening of the first metal member may be reduced and to prevent a joining defect caused by a shortage of metal may be prevented.

Further, the butting process preferably includes butting the first metal member and the second metal member against each other while back faces of the first metal member and the second metal member are flush with each other.

According to the joining method described above, the back faces of the metal members may be flush with each other.

Furthermore, the butting process preferably includes butting the first metal member and the second metal member against each other preferably so that a back face of the first metal member is located lower than a back face of the second metal member and a front face of the first metal member is located higher than a front face of the second metal member. Moreover, the joining process preferably includes setting a depth of insertion of the stirring pin so that a tip end of the stirring pin is located lower than the back face of the second metal member.

According to the joining method described above, a friction stir welding may be carried out across the entire depth of the second metal member.

Further, the joining process preferably includes setting a rotation direction and a moving direction of the rotary tool so that a plasticized region is formed along a moving track of the rotary tool, a portion of the plasticized region which is located in the second metal side is set to be a shear side and a portion of the plasticized region which is located in the first metal member is set to be a flow side.

Among the plasticized region, when a portion of the plasticized region which is located in the second metal member side having higher melting point is set to be the flow side, the temperature of the first metal member at the butted portion is decreased, interdiffusion at an interface of the different metals is not accelerated and a joining defect may be occurred. However, according to the manufacturing method described above, the temperature of the first metal member in the butted portion may be kept relatively high by setting a portion of plasticized region located in the second metal member side having the higher melting point to be the shear side. Thus, interdiffusion at the interface of the different metals is accelerated and occurrence of a joining defect may be prevented.

Note that the shear side is a side on which the speed of the circumference of the rotary tool relative to the joint portion is equal to the moving speed of the rotary tool added to the tangential speed on the circumference of the rotary tool, and the flow side is a side on which the velocity of the outer circumference of the rotary tool relative to the joint portion is equal to the moving speed of the rotary tool subtracted to the tangential speed on the circumference of the rotary tool.

Further, the preparation process preferably includes forming the first metal member from any of aluminum and an aluminum alloy and the second metal member from any of copper and a copper alloy. Moreover, joining process preferably includes joining the first metal member and the second metal member by relatively moving the rotary tool along the butted portion while only the stirring pin comes in contact with only the first metal member.

According to the joining method described above, the metal member made of copper or a copper alloy and the metal member made of aluminum or an aluminum alloy are joined suitably.

Furthermore, joining process preferably includes rotating the rotary tool clockwise when a spiral groove is engraved counterclockwise from a base to a tip on an outer circumferential face of the rotary tool and rotating the rotary tool counterclockwise when the spiral groove is engraved clockwise from the base to the tip on the outer circumferential face of the rotary tool.

According to the joining method described above, the metal that is plasticized and fluidized is led to the spiral groove and occurrence of burrs may prevented.

Advantageous Effects of Invention

According to a joining method and a method for manufacturing a rolled composite material of the present invention, metallic members of different types can be joined suitably.

DESCRIPTION OF EMBODIMENTS

First Embodiment

A method for manufacturing a rolled composite material according to an embodiment of the present invention will be described in detail with reference to the drawings. First, a rotary tool used in this embodiment will be described.

Figure 1:
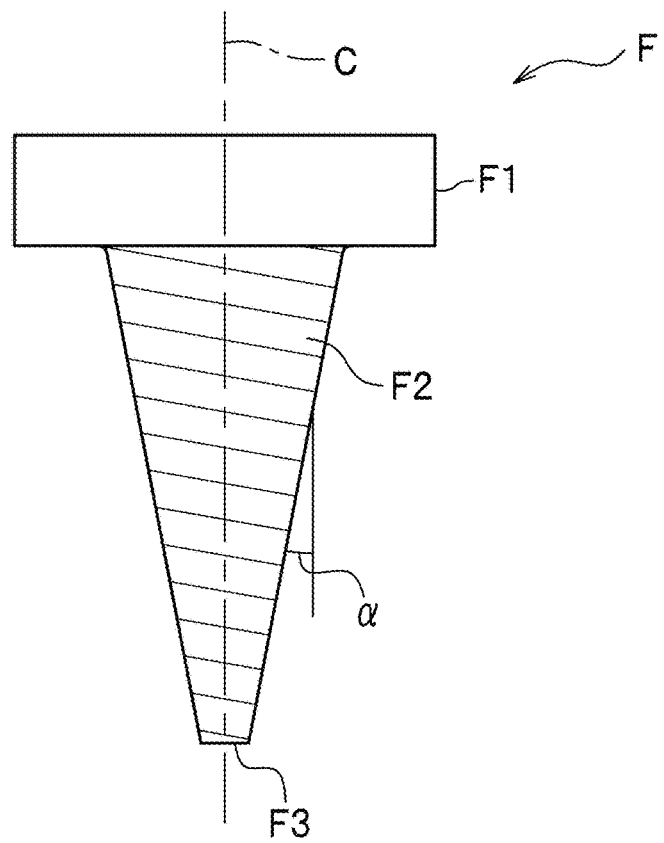
FIG. 1 is a side view of a rotary tool according to an embodiment of the present invention.

As shown in FIG. 1, a rotary tool F includes a connection portion F1 and a stirring pin F2. The rotary tool F is formed from a tool steel, for example. The connection portion F1 is a portion that connects to a rotary shaft of a friction stirring apparatus (not shown in figure). The connector portion F1 has a cylindrical shape and a threaded hole (not shown) to which bolts are fastened.

The stirring pin F2 hangs down from the connection portion F1 and is coaxial with the connection portion F1. The stirring pin F2 is tapered off away from the connection portion F1. When viewed from the side, the inclination angle α formed between a vertical axis C and the outer circumferential face of the stirring pin F2 is set to 15° in this embodiment. The inclination angle α is appropriately set in a range of 10° to 60°. Below 10° of the inclination angle α is not preferable because burrs run from the outer circumferential face of the stirring pin F2 at the time of joining and the burrs may cause joining defects. Above 60° of the inclination angle α is not preferable because a diameter of the rotary tool F becomes too large whereby loads on the rotary tool F and the friction stirring apparatus are increased.

A spiral groove is engraved on the outer circumferential face of the stirring pin F2. Since the rotary tool F is rotated in a clockwise direction in this embodiment, the spiral groove is formed in a counterclockwise direction from a base to a tip. In other words, when tracing the spiral groove from the base to the tip of the stirring pin F2, the spiral groove spirals in a counterclockwise direction as viewed from above. A flat face F3 which is horizontal to the vertical axis C is formed at the tip end of the stirring pin F2.

Note that, if the rotary tool F is to be rotated counterclockwise, the spiral groove should preferably be formed with a clockwise spiral. In other words, when tracing the spiral groove from the base to the tip of the stirring pin F2, the spiral groove spirals in a clockwise direction as viewed from above the base of the stirring pin F2. The spiral groove is set in this way to allow metal that is plasticized and fluidized during friction stirring to be led by the spiral groove to the side of the tip of the stirring pin F2. In this way, it is possible to reduce the amount of metal that spills out from metal members being joined together (a first metal member 1 and a second metal member 2).

Figure 2:
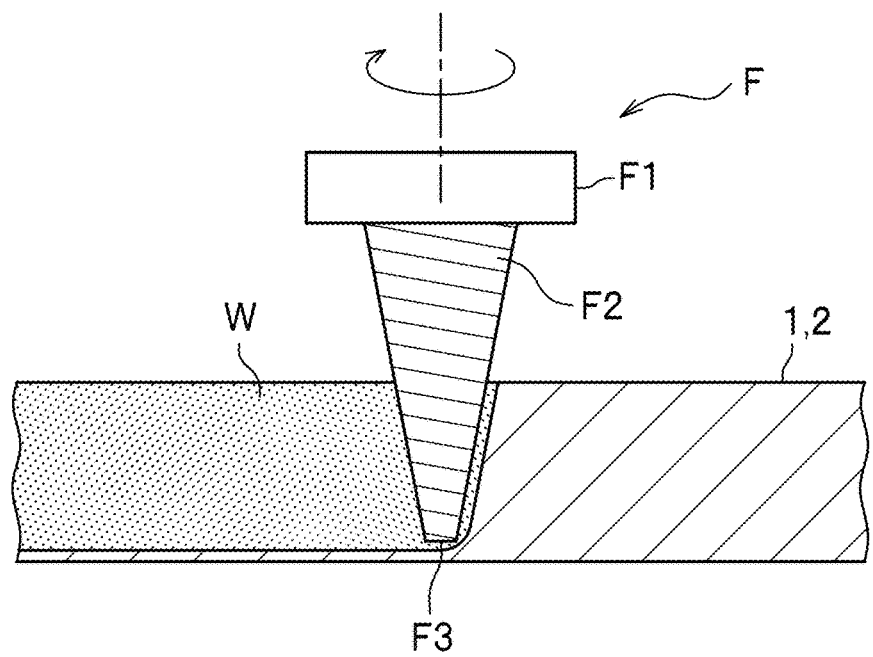
FIG. 2 is a schematic cross-sectional view of the rotary tool in a joining operation according to the embodiment.

As shown in FIG. 2, when the friction stirring is carried out by using the rotary tool F, the rotary tool F is moved so that only the stirring pin F2 rotating clockwise is inserted into the metal members being joined together, with the connection portion F1 kept away from the metal members being joined together. In other words, the friction stirring is carried out while the base portion of the stirring pin F2 exposed. A plasticized region W is formed as the friction stirred metal hardens along the moving track of the rotary tool F.

Next, a method for manufacturing a rolled composite material of this embodiment will be described. The method for manufacturing a rolled composite material according to this embodiment includes rolling a pair of metal members after joining the metal members with the rotary tool F and obtaining a rolled composite material. Note that an opposite side of a "back face" will be referred to as a "front face" in the following description.

Figure 3:
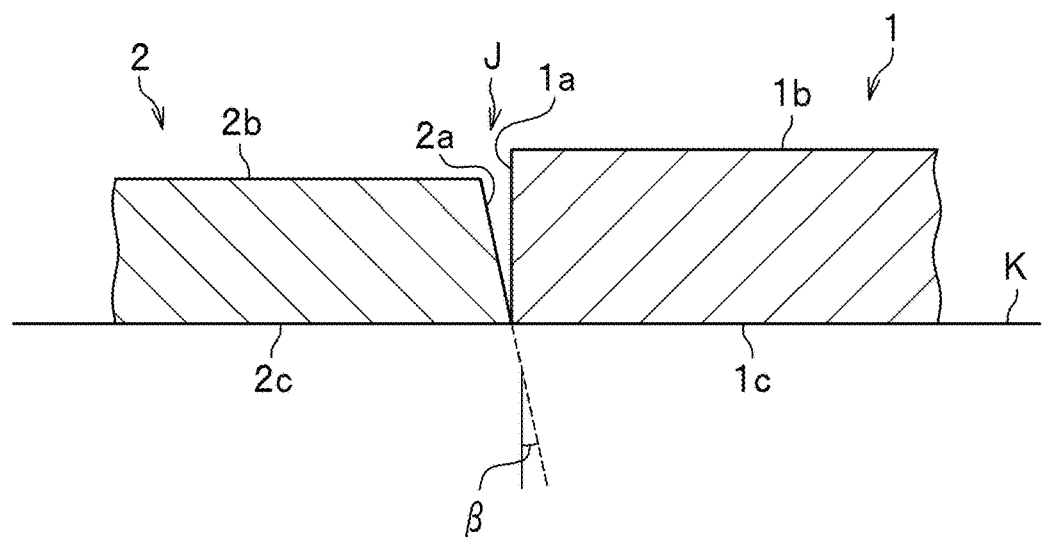
FIG. 3 is a cross-sectional view of a preparing process and a butting process according to a first embodiment of the present invention.

As shown in FIG. 3, the first metal member 1 is plate-shaped. An end face 1a of the first metal member 1 is a vertical face which is vertical with respect to a front face 1b and a back face 1c. Although the first metal member 1 is made of an aluminum alloy in this embodiment, the first metal member 1 may be made of another metal material that can be used for friction stirring, such as aluminum, copper, a copper alloy, titanium, a titanium alloy, magnesium, and a magnesium alloy.

The second metal member 2 is plate-shaped. A plate thickness of the second metal member 2 is set smaller than a plate thickness of the first metal member 1. An end face 2a of the second metal member 2 is an inclined face which is inclined with respect to the vertical face. While an inclination angle β of the end face 2a may be set to an appropriate angle, the inclination angle β is set equal to the inclination angle α of the stirring pin F2 in this embodiment. The second metal member 2 is made of a material having the melting point higher than that of the first metal member 1 and is used for friction stirring. The second metal member 2 may be made of copper or a copper alloy, for example.

The method for manufacturing a rolled composite material according to this embodiment includes a preparation process, a butting process, a joining process, and a rolling process. Note that a joining method in the appended claim is a process of conducting the preparation process, the butting process, and the joining process.

The preparation process is a process of preparing the first metal member 1, the second metal member 2, and the rotary tool F.

As shown in FIG. 3, the butting process is a process of butting end portions of the first metal member 1 and the second metal member 2 together. In the butting process, a butted portion J is formed by butting the end face 1a of the first metal member 1 and the end face 2a of the second metal member 2. A V-shape gap as viewed in cross-section is formed in the butted portion J such that an opening of the gap widens nearer to front faces 1b and 2b. The back face 1c of the first metal member 1 and a back face 2c of the second metal member 2 are flush with each other. The first metal member 1 and the second metal member 2 are immovably fixed to a frame K.

Figure 4:
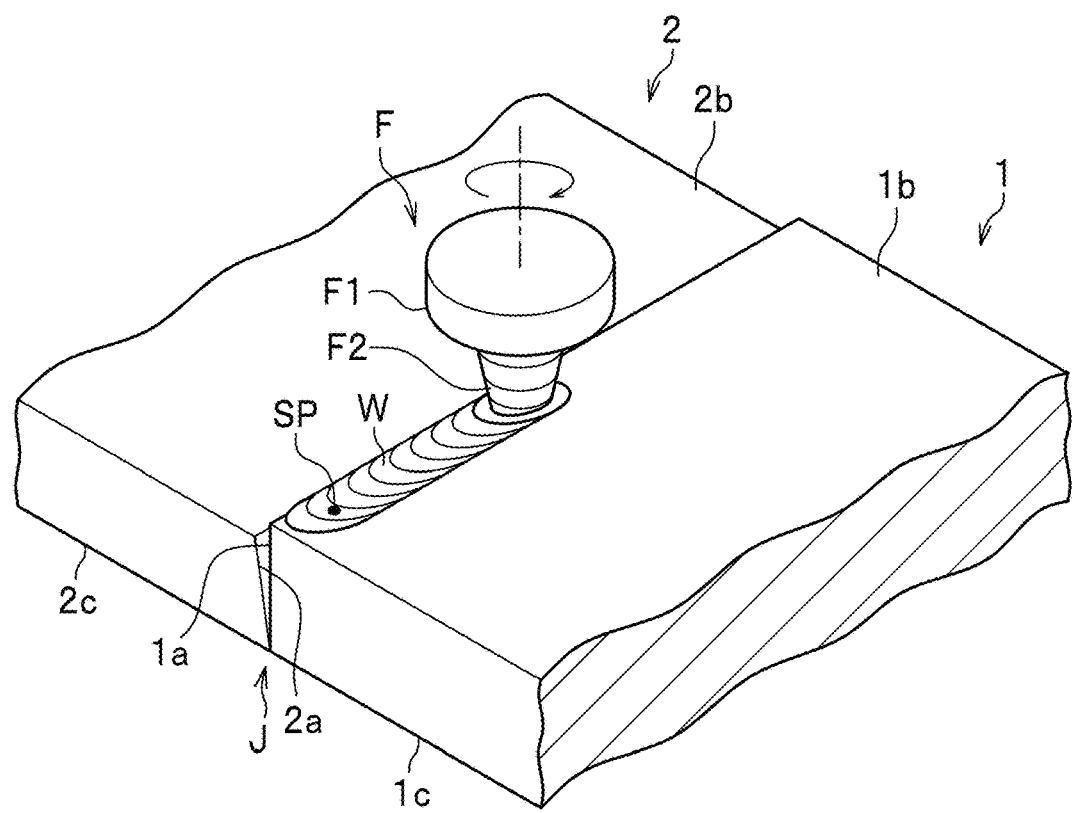
FIG. 4 is a perspective view of a joining process according to the first embodiment.

The joining process is a process of joining the first metal member 1 and the second metal member 2 by using the rotary tool F. As shown in FIG. 4, in the joining process, the rotary tool F is inserted into a start position Sp which is on the front face 1b of the first metal member 1 and is set to be in the vicinity of the butted portion J, while the stirring pin F2 of the rotary tool F is rotated. Then, the rotary tool F is moved relatively in parallel with an extending direction of the butted portion J. The plasticized region W is formed along the moving locus of the rotary tool F. In the joining process, friction stir welding is carried out so that a material that undergoes plasticization and fluidization of the first metal member 1 side mainly flows into the gap of the butted portion J.

In the joining process, the second metal member 2 side (a near side to the butted portion J) of the plasticized region W is set to be a shear side while the first metal member 1 side (a far side from the butted portion J) is set to be a flow side. Namely, in the joining process according to this embodiment, the first metal member 1 is set to be on the right side of moving direction and the rotary tool F is rotated clockwise. When the second metal member 2 is located on the right side of moving direction, the rotary tool F is rotated counterclockwise whereby the second metal member 2 side (the near side to the butted portion J) of the plasticized region W is in the shear side.

Figure 5:
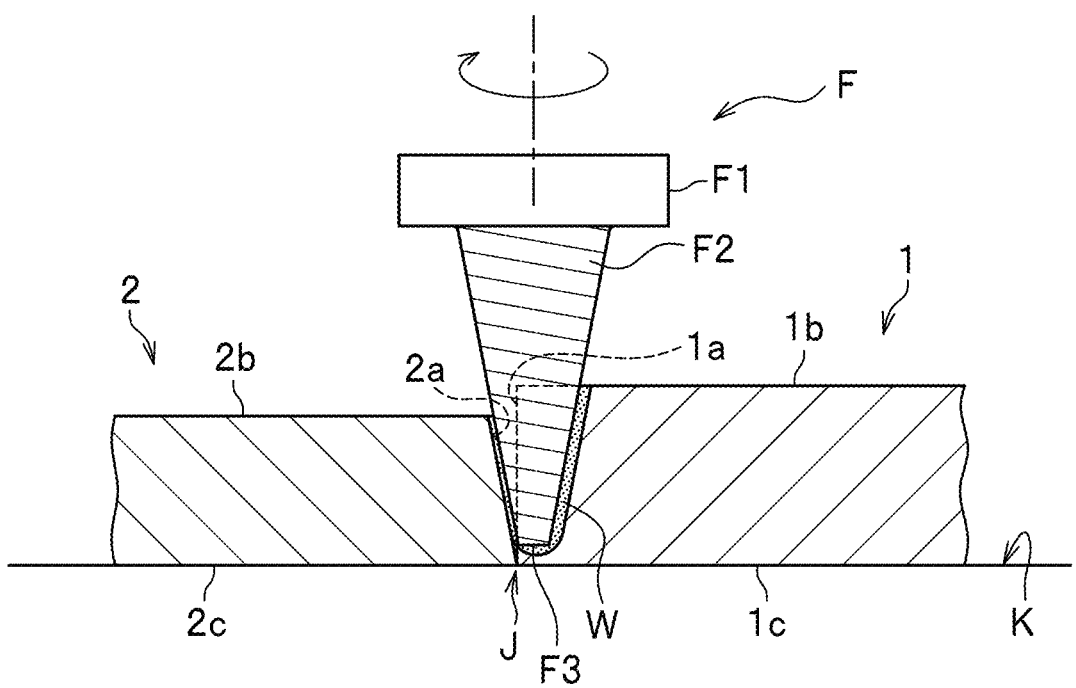
FIG. 5 is a cross-sectional view of the joining process according to the first embodiment.

While a depth of insertion of the stirring pin F2 may be appropriately set as shown in FIG. 5, the depth is set to about 90% of the plate thickness of the first metal member 1 in this embodiment. Meanwhile, in the joining process of this embodiment, the location of the start position Sp and a route of the movement are set so that the rotary tool F is not in contact with the second metal member 2 and that the first metal member 1 and the second metal member 2 are joined each other with a diffusion bonding technique by friction stirring.

Here, if the outer circumferential face of the rotary tool F is located significantly away from the second metal member 2, the first metal and the second metal are not diffused at the butted portion J and the first metal member 1 and the second metal member 2 cannot be firmly joined to each other. On the other hand, if the rotary tool F is in contact with the second metal member 2 and the friction stirring is carried out with a large overlapping margin thereof, then it is necessary to increase an amount of heat input by adjusting joining conditions in order to soften the second metal member 2, and a joining defect is prone to occur as a consequence. Accordingly, in order that the first metal and the second metal may be diffused and joined to each other at the butted portion J, it is preferable to conduct the joining while the outer circumferential face of the rotary tool F and the second metal member 2 are in slightly contact with each other or the outer circumferential face of the rotary tool F and the second metal member 2 are close to each other as possible without contact.

Further, in the case where the first metal member 1 is the member formed from aluminum or an aluminum alloy and the second metal member 2 is the member formed from copper or a copper alloy as in this embodiment, it is preferable to carry out the joining in the joining process by bringing the outer circumferential face of the rotary tool F and the second metal member 2 as close to each other as possible without contact. Incidentally, if the outer circumferential face of the rotary tool F and the second metal member 2 (the copper member) are in contact with each other under a condition of increasing the amount of heat input, a small amount of the copper member is stirred and mixed into the aluminum alloy member and Al/Cu interdiffusion is accelerated. Hence, an Al—Cu phase dispersed in the aluminum alloy member is transformed into a liquid phase and a lot of burrs may be generated from the aluminum alloy member side and may cause joining defects.

Figure 6:
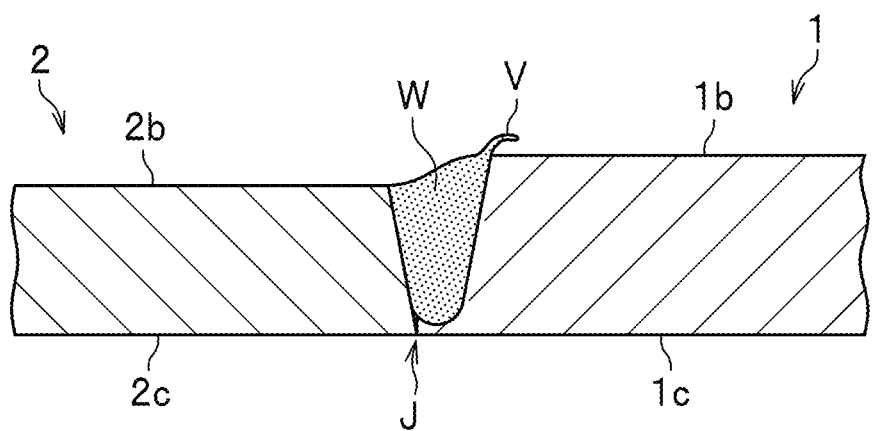
FIG. 6 is a cross-sectional view of a state after the joining process according to the first embodiment.

As shown in FIG. 6, burrs V are generated on a surface of the plasticized region W. The plasticized region W is adjacent to the second metal member 2. In other words, the plasticized region W is not formed on the second metal member 2 side beyond the butted portion J. Since the first metal member 1 is formed thicker than the second metal member 2, a material that undergoes plasticization and fluidization of the first metal member 1 flows into the gap of the butted portion J and no concave grooves or the like are generated on the surface of the plasticized region W. In other words, it is possible to prevent a shortage of metal at a joined portion. It is preferable to carry out a burr cutting process of cutting the burrs V off when the joining process is completed.

Figure 7:
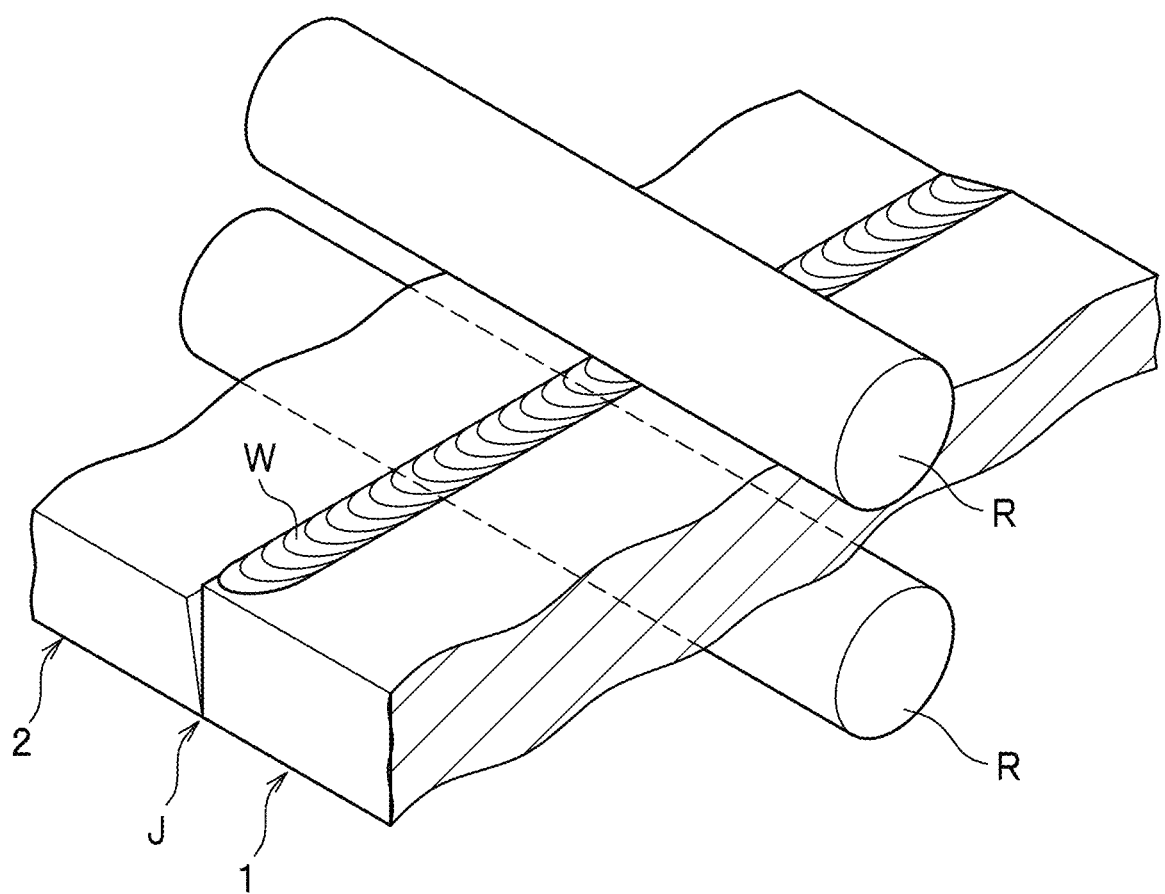
FIG. 7 is a perspective view of a rolling process according to the first embodiment.
Figure 8:
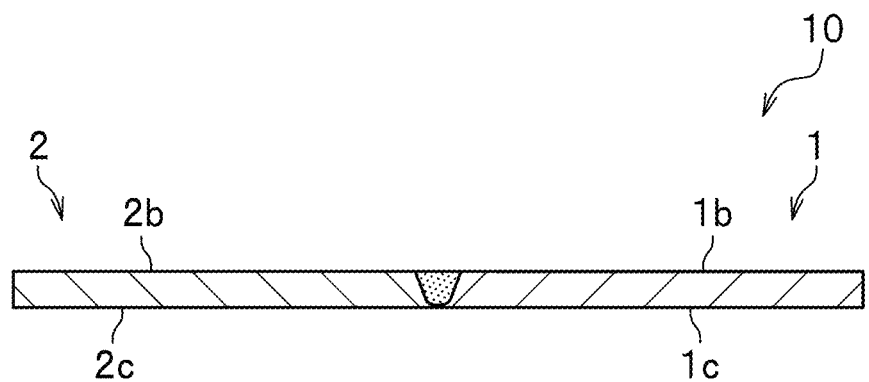
FIG. 8 is a cross-sectional view of a state after the rolling process according to the first embodiment.

The rolling process is a process of rolling the first metal member 1 and the second metal member 2. As shown in FIG. 7, cold rolling is carried out in the rolling process by using a rolling mill provided with rollers R, R. In the rolling process, the rolling is performed by setting a joining line (the plasticized region W) in the joining process as a rolling direction. Accordingly, a rolled composite material 10 is formed as shown in FIG. 8. A rolling draft ratio in the rolling process may be appropriately set depending on the materials of the first metal member 1 and the second metal member 2 or an intended use of the rolled composite material 10. Although a difference in plate thickness between the first metal member 1 and the second metal member 2 occurs after the joining process as shown in FIG. 6, the rolled composite material is rolled to the extent that the difference is negligible after the rolling process shown in FIG. 8.

According to the method for manufacturing a rolled composite material and the joining method described above, the end face 1a of the first metal member 1 is formed perpendicular to the front face 1b and the back face 1c in the joining process. Thus, the first metal member 1 is prepared easily. Further, although the second metal member 2 is provided with the inclined face, butting is easily conducted by retaining a V-shaped gap as viewed in cross-section in the butting process. More further, since the plate thickness of the first metal member 1 is set larger than the plate thickness of the second metal member 2 and the joining is conducted in the joining process in such a way as to cause the material that undergoes plasticization and fluidization to flow into the gap at the butted portion J. Thus, a shortage of the metal at the joint portion is prevented.

Moreover, since a shoulder portion of the rotary tool is not in contact with the first metal member 1 or the second metal member 2, the amount of heat input is reduced and friction resistance is reduced. As a consequence, loads on the rotary tool F and the friction stirring apparatus are decreased. Further, in the case where the first metal member 1 is formed from aluminum or an aluminum alloy and the second metal member 2 is the formed from copper or a copper alloy as in this embodiment, it is preferable to conduct the joining while the outer circumferential face of the rotary tool F and the second metal member 2 (the copper member) are close to each other as possible without contact. This accelerates interdiffusion of the first metal member 1 and the second metal member 2 at the butted portion J whereby the members are firmly joined without generating excessive burrs V from the aluminum alloy member side. Therefore, the amount of heat input to the first metal member 1 and the second metal member 2 is decreased as compared to the related art, the loads on the rotary tool F and the friction stirring apparatus are reduced, and generation of excessive burrs V from the first metal member 1 side is prevented. Furthermore, since the shoulder portion is kept from coming into contact with the first metal member 1 or the second metal member 2, the rotary tool F is prevented from being heated to a high temperature. In this way, the material of the rotary tool F may be selected easily and the product life of the rotary tool F may be extended as well.

When the second metal member 2 side having the higher melting point in the plasticized region W is the flow side, the temperature of the first metal member 1 at the butted portion J is reduced, interdiffusion at the interface of the different metals is not accelerated and a joining defect is possibly caused. If the joining conditions are adjusted in such a way as to increase the amount of heat input, the burrs are excessively generated on the first metal member 1 side which is the shear side, and a joining defect is caused. However, as in this embodiment, the temperature of the first metal member 1 of the butted portion J is kept relatively high by setting the joining conditions (a rotation direction and a moving direction of the rotary tool F, and so forth) so that the second metal member 2 having the higher melting point is the shear side in the plasticized region W. Thus, interdiffusion at the interface of the different metals are accelerated and a joining defect may be prevented.

Although the outer circumferential face of the rotary tool F may be in slight contact with the second metal member 2, the rotary tool F is made to avoid contact with the second metal member 2 in this embodiment. Accordingly, the first metal member 1 and the second metal member 2 may be prevented from being mixed and stirred together and a joining defect caused by generation of the excessive burrs V may be more certainly prevented.

Further, in this embodiment, the inclination angle $\alpha$ (see FIG. 1) of the outer circumferential face of the stirring pin F2 is set to the same angle as the inclination angle $\beta$ (see FIG. 3) of the end face 2a of the second metal member 2. Although the inclination angle $\alpha$ and the inclination angle $\beta$ may be set different from each other, setting these angles equally makes it easier to set a distance between the rotary tool F and the second metal member 2. In other words, it is easier to make the outer circumferential face of the rotary tool F and the second metal member 2 be close to each other as possible as close to each other as possible without being in contact with each other.

Second Embodiment

A method for manufacturing a rolled composite material according to a second embodiment of the present invention will be described. The method for manufacturing a rolled composite material according to this embodiment includes a preparation process, a butting process, a joining process, and a rolling process.

Figure 9:
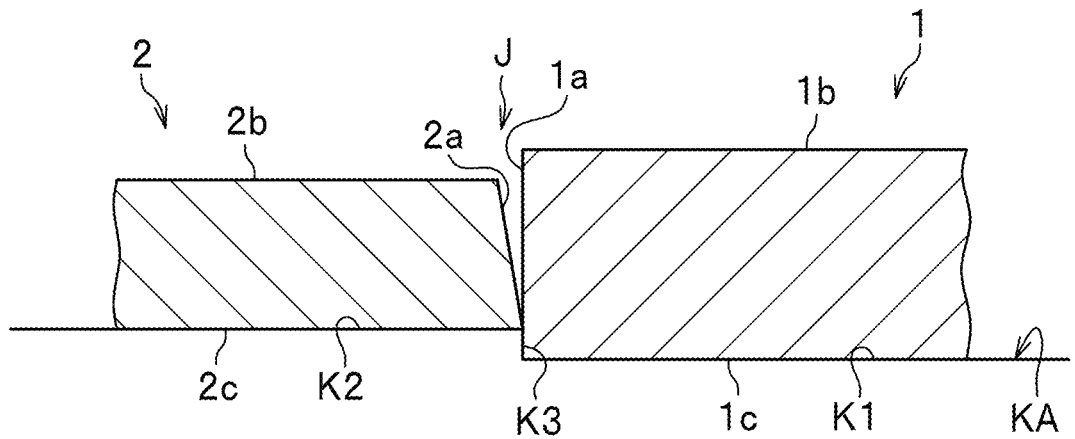
FIG. 9 is a cross-sectional view of a preparing process and a butting process according to a second embodiment of the present invention.

As shown in FIG. 9, a stepped frame KA is prepared in the preparation process. The stepped frame KA includes a bottom portion K1, a bottom portion K2 located one step higher than the bottom portion K1, and a step side face K3.

In the butting process, the end portions of the first metal member 1 and the second metal member 2 are butted together as shown in FIG. 9. The first metal member 1 is disposed on the bottom portion K1 and the end face 1a of the first metal member 1 is in contact with the step side face K3. The butted portion J is formed by butting the first metal member 1 and the second metal member 2 together. A V-shaped cross-section is formed in the butted portion J as with the first embodiment. With the first metal member 1 and the second metal member 2 butted, the front face 1b of the first metal member 1 is located at a higher position than the front face 2b of the second metal member 2, and the back face 1c of the first metal member 1 is located at a position lower than the back face 2c of the second metal member 2.

Figure 10:
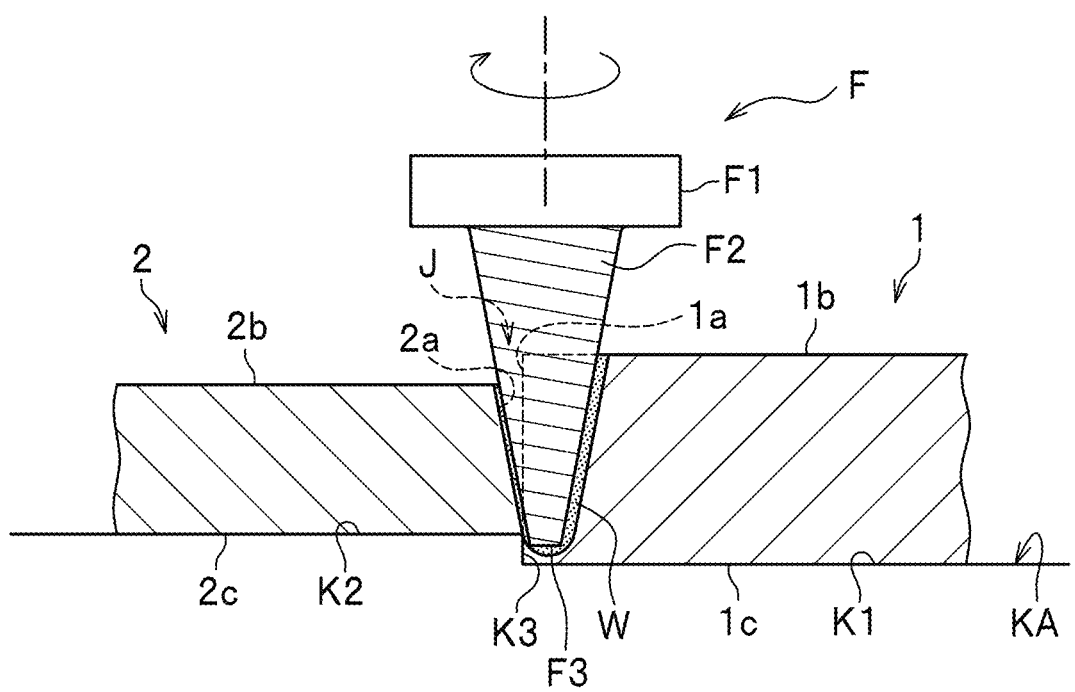
FIG. 10 is a cross-sectional view of a joining process according to the second embodiment.
Figure 11:
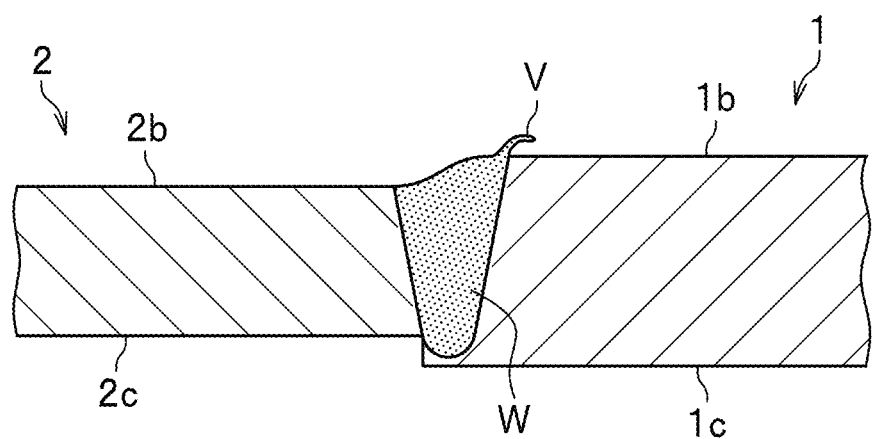
FIG. 11 is a cross-sectional view of a state after the joining process according to the second embodiment.

As shown in FIG. 10, the joining process is the process of joining the first metal member 1 and the second metal member 2 by using the rotary tool F. In the joining process, the friction stirring is performed in the same manner as the first embodiment. Specifically, the rotary tool F is inserted into the start position on the front face 1b of the first metal member 1 and in the vicinity of the butted portion J while the stirring pin F2 of the rotary tool F is rotated. Then, the rotary tool F is moved relatively in parallel with an extending direction of the butted portion J. Although the rotary tool F may be slight contact with the second metal member 2, the friction stirring is carried out while the rotary tool F is in contact only with the first metal member 1 in this embodiment. The plasticized region W is formed in the moving track of the rotary tool F. In the joining process, the friction stir welding is carried out so that the plastically flowing material on the first metal member 1 side mainly flows into the gap of the butted portion J.

In the joining process according to this embodiment, the depth of insertion of the stirring pin F2 of the rotary tool F is set so that the tip end (the flat face F3) of the stirring pin F2 is located below the back face 2c of the second metal member 2. The rolling process is the same as that of the first embodiment.

The above-described second embodiment may achieve almost the same effects as those of the first embodiment. In the first embodiment, as shown in FIG. 5, it is difficult to join the second metal member 2 entirely in the height direction thereof. However, the friction stir welding is carried out in the second embodiment while the stirring pin F2 is inserted to the position deeper than the back face 2c of the second metal member 2 as shown in FIG. 10. Accordingly, the second metal member 2 may be joined entirely in the direction of the plate thickness thereof. In this way, joint strength between the first metal member 1 and the second metal member 2 may be increased.

REFERENCE SIGNS LIST 1 first metal member
2 second metal member
F rotary tool
F1 connection portion
F2 stirring pin
F3 flat face
J butted portion
W plasticized region

What is claimed is:

1. A joining method for joining a pair of metal members made of different materials by using a rotary tool with a tapered stirring pin, the method comprising:
   a preparation process configured to provide a first metal member including an end portion with a vertical face, and a second metal member including an end portion with an inclined face, the second metal member having a higher melting point and a smaller plate thickness than the first metal member;
   a butting process configured to butt the end portions of the first metal member and the second metal member against each other and form a butted portion with a V-shaped gap; and
   a joining process configured to join the first metal member and the second metal member together by inserting the rotating rotary tool from only a front face of the first metal member and relatively moving the rotary tool along the butted portion while only the stirring pin is in contact with at least the first metal member, wherein
   the preparation process includes preparing a stepped frame including a first bottom portion, a step side face rising from the first bottom portion and a second bottom portion located one step higher than the first bottom portion, in which the step side face is located in between the first bottom portion and the second bottom portion,
   the butting process includes disposing the first metal member on the first bottom portion as well as disposing the second metal member on the second bottom portion, and butting the first metal member and the second metal member against each other so that a back face of the first metal member is located lower than a back face of the second metal member and a front face of the first metal member is located higher than a front face of the second metal member, and
   the joining process includes setting a depth of insertion of the stirring pin so that a tip of the stirring pin is located lower than the back face of the second metal member.

2. The joining method according to claim 1, wherein the butting process includes butting the first metal member and the second metal member against each other while back faces of the first metal member and the second metal member are flush with each other.

3. The joining method according to claim 1, wherein the joining process includes setting a rotation direction and a moving direction of the rotary tool so that a plasticized region is formed along a moving track of the rotary tool, a portion of the plasticized region which is located in the second metal side is set to be a shear side and a portion of the plasticized region which is located in the first metal member is set to be a flow side.

4. The joining method according to claim 1, wherein the preparation process includes preparing the first metal member formed from aluminum or an aluminum alloy and the second metal member formed from copper and a copper alloy; and
   the joining process includes joining the first metal member and the second metal member together by relatively moving the rotary tool along the butted portion while only the stirring pin comes in contact with only the first metal member in the joining process.

5. The joining method according to claim 1, wherein the joining process includes:
   rotating the rotary tool clockwise when a spiral groove is engraved counterclockwise from a base to a tip on an outer circumferential face of the rotary tool; and
   rotating the rotary tool counterclockwise when the spiral groove is engraved clockwise from the base to the tip on the outer circumferential face of the rotary tool.

6. A manufacturing method for a rolled composite material formed from a pair of metal members made of different materials, the method comprising:
   a preparation process configured to provide a first metal member including an end portion with a vertical face, a second metal member including an end portion with an inclined face, the second metal member having a higher melting point and a smaller plate thickness than the first metal member, and a rotary tool with a tapered stirring pin;
   a butting process configured to butt the end portions of the first metal member and the second metal member against each other and form a butted portion with a V-shaped gap;
   a joining process configured to join the first metal member and the second metal member together by inserting the rotating rotary tool from only a front face of the first metal member and relatively moving the rotary tool along the butted portion while only the stirring pin is in contact with at least the first metal member; and
   a rolling process configured to roll the metal members joined in the joining process in a rolling direction along a joining line of the metal members, wherein the preparation process includes preparing a stepped frame including a first bottom portion, a step side face rising from the first bottom portion, and a second bottom portion located one step higher than the first bottom portion, in which the step side face is located in between the first bottom portion and the second bottom portion, the butting process includes disposing the first metal member on the first bottom portion as well as disposing the second metal member on the second bottom portion, and butting the first metal member and the second metal member against each other so that a back face of the first metal member is located lower than a back face of the second metal member and a front face of the first metal member is located higher than a front face of the second metal member, and the joining process includes setting a depth of insertion of the stirring pin so that a tip of the stirring pin is located lower than the back face of the second metal member.

7. The joining method according to claim 1, wherein the butting process includes butting the first metal member and the second metal member while the vertical face of the first metal member is in contact with the step side face.

8. The manufacturing method according to claim 6, wherein the butting process includes butting the first metal member and the second metal member while the vertical face of the first metal member is in contact with the step side face.

* * * * *